United States Patent [19]

Baumgartner

[11] 3,957,914

[45] May 18, 1976

[54] CYCLIC POLYMERIZATION PROCESS

[75] Inventor: Herman J. Baumgartner, Cypress, Calif.

[73] Assignee: Shell Oil Company, Houston, Tex.

[22] Filed: Sept. 18, 1974

[21] Appl. No.: 507,175

Related U.S. Application Data

[63] Continuation-in-part of Ser. No. 334,817, Feb. 22, 1973, abandoned.

[52] U.S. Cl. .................. 260/880 B; 260/96 HY; 526/20; 526/25; 526/70; 526/81; 526/82; 526/173; 526/210; 526/90; 528/500

[51] Int. Cl.$^2$ ................. C08F 8/04; C08F 297/04

[58] Field of Search ....... 260/96 HY, 880 B, 93.5 S, 260/93.5 A, 89.5 S, 94.7 HA, 85.1

[56] References Cited

UNITED STATES PATENTS

| | | | |
|---|---|---|---|
| 2,975,160 | 3/1961 | Zelinski | 260/83.7 |
| 3,030,346 | 4/1962 | Cooper | 260/83.7 |
| 3,119,800 | 1/1964 | Moss et al. | 260/94.2 |
| 3,287,333 | 11/1966 | Zelinski | 260/83.7 |
| 3,356,763 | 12/1967 | Dollinger et al. | 260/880 |
| 3,452,119 | 6/1969 | Hinton | 260/880 |
| 3,598,886 | 8/1971 | Hoeg et al. | 260/879 R |
| 3,644,588 | 2/1972 | Hassell | 260/879 |
| 3,753,936 | 8/1973 | Marrs | 260/27 R |

*Primary Examiner*—Stanford M. Levin

[57] ABSTRACT

A cyclic process is provided for the polymerization and hydrogenation of certain polymers wherein the monomer is anionically polymerized in solution, the living polymers then being terminated by the use of a proton donor, after which the polymer is subjected to catalytic hydrogenation wherein the catalyst is optionally activated with certain polar compounds after which the polymer is coagulated and heated to remove any residual terminator and activator and the solvent is fractionally distilled to recover and recycle the solvent without contamination from the substantially higher boiling terminator and optional activator.

5 Claims, No Drawings

CYCLIC POLYMERIZATION PROCESS

This application is a continuation-in-part of co-pending application Ser. No. 334,817, filed Feb. 22, 1973, now abandoned.

BACKGROUND OF THE INVENTION

The use of lithium-based initiators for polymerization of conjugated vinyl compounds is well known. This usually takes place in the presence of a solvent and results in a so-called "living polymer" wherein the growing end or ends of the polymer are capped by a lithium ion. As U.S. Pat. No. 3,119,800 indicates, the living polymers may then be terminated by reaction with various alcohols.

It is also known to hydrogenate polymers by the use of Ziegler-type catalysts, or particularly the reaction products of cobalt or nickel alkanoates with aluminum reducing agents such as an aluminum trialkyl. As U.S. Pat. No. 3,644,588 shows, this reaction product may be activated by the presence of various alcohols among other weak Lewis acids.

In any commercially feasible process, it is necessary to be able to readily purify the principle desired product, in this case a polymer, and also to purify other components of the reaction mixture for recycle, primarily the solvents employed. However, the art does not effectively teach how this can be done. For example, when a lower alcohol such as isopropanol is employed as either the terminator during polymerization or as an activator for the catalyst in the hydrogenation step, it then becomes a problem to effectively separate the alcohol from the solvent employed in both of these stages for later recycle due to the relative closeness of the boiling points of the alcohol and the usual solvents utilized and the azeotrope formed between the solvent and alcohol. On the other hand, if the activator or terminator are of too high a boiling point, then it becomes virtually impossible to separate residual quantities of them from the coagulated polymer by normal processing techniques such as drying, steam sparging or the like.

OBJECT OF THE INVENTION

It is an object of the present invention to provide an improved cyclic polymerization and hydrogenation process. It is a specific object of the invention to provide such a process wherein the polymers may be readily purified from contaminating components and wherein the solvents may be readily separated from contaminents known to be undesirable during the following detailed discussion of the invention.

STATEMENT OF THE INVENTION

Now, in accordance with the present invention, a cyclic process for achieving the above objectives is provided which comprises: (a) forming a living polymer by anionic solution polymerization with a lithium-based initiator, the solvent for said solution having a maximum boiling point of X°C at atmospheric pressure, said living polymer having a lithium ion associated with at least one end of each polymer chain by a metal-carbon linkage; (b) terminating a polymer by contact in a polymer solution with at least a sufficient amount of a proton-doner organic compound, e.g., an alcohol, carboxylic acid, primary amine or secondary amine, having a boiling point of at least X + 40°C to react with each lithium radical; (c) subjecting the so-terminated polymer while still in said solution to hydrogenation, using as the hydrogenation catalyst the reaction product of a nickel, or cobalt alkanoate or carboxylate and an organo aluminum reducing agent, said reaction product being optionally activated with an organic compound having a boiling point of at least X + 40°C of the group consisting of carboxylic acids, alcohols and amines; (d) coagulating the hydrogenated polymer with steam, whereby the proton donor is regenerated, said polymer containing minor proportions of the proton donor and activator; said solvent containing minor proportions of the proton donor and optional activator; (e) heating the polymer sufficiently to volatilize the proton donor and activator without material decomposition of the polymer; (f) fractionally distilling the solvent phase (contaminated with minor amounts of proton donor and optional activator), whereby a distillate fraction comprising the majority of the solvent is separated from a bottoms phase comprising a majority of the proton donor and activator; (g) and recycling the purified and recovered solvent so obtained for use in stage a) for the polymerization of further quantities of the polymer.

It has been found essential to utilize proton donors and optional activators meeting the above-described requirement if complete separation of both of these is to be successful both from the polymeric product and from the solvent prior to its recycle. If a lower molecular weight material such as isopropyl alcohol is utilized in either or both of these stages, i.e., proton donating and catalyst activation, then it is troublesome to separate the low boiling alcohol from the normally employed solvent since they boil so closely together.

Lower alcohols, such as isopropanol or butanols or lower acids such as formic and acetic boil at temperatures close to that of desirable solvents and form azeotropes therewith which boil close to the boiling point of the solvent. Thus, the operable terminators and optional activators should boil at least 40°C above the boiling point of the solvent and preferably do not form azeotropes with the solvent.

By the use of the present invention, namely in employing particluar proton donors and activating agents having a limited boiling range relative to the solvent and relative to their ease of removal from the coagulated polymer, that purification of both polymer and of solvent is readily achieved. The proton donor materials, defined further hereinafter, effectively terminate the living polymers, are high enough boiling that they can be separated as a bottoms product from a fractional distillation of the solvent but are low enough boiling that they are readily removed from the coagulated polymer by heating such as by steam stripping, or the like. It is advantageous to utilize the same compound for both proton donor and catalyst activator since this simplifies the conditions required in both of he recovery steps, namely in product purification and in solvent recovery and recycle.

The monomerswhich may be polymerized anionically include especially conjugated vinyl compounds capable of giving stable carbanions, using as a catalyst a lithium-based initiator. This results in a living polymer which is capped by a lithium ion or atom on any growing polymer end. As the conjugated vinyl compounds giving a stable carbanion which will result in a living polymer, there may be used any compound of this kind so far as it is anionically polymerizable. Specific examples of such monomers include conjugated vinyl compounds, such as monoalkenyl arenes, e.g. styrene, alphamethylstyrene, tertbutylstyrene, vinyl toluene and vinyl naphthalene. Alkenyl pyridines may be utilised such as 2-vinyl pyridine or 4-vinyl pyridine. Unsaturated esters may be employed, particularly, acrylic esters such as methylacrylate, ethylacrylate, methyl methacrylate and ethyl methacrylate. Conjugated dienes may be employed especially those having from 4 to 8 carbon atoms per molecule and particularly butadiene and isoprene.

These monomers may be utilized alone to form homopolymers or may be used in any desired mixture to form random copolymers, tapered copolymers or block copolymers. The specific configuration of the polymers or the specific monomers employed in obtaining such polymers do not go to the eesence of the present invention. However, it can be mentioned that homopolymers such as polystyrene or polyisoprene are contemplated as well as random copolymers such as solution SBR; tapered copolymers wherein for example mixtures of a conjugated diene such as butadiene or isoprene with an alkenyl arene such as styrene are polymerized with a lithium-based initiator at least part of the time in the absence of any randomizing agent to obtain a copolymer having one copolymer block and one homopolymer block, such as a copolymeric block of styrene with isoprene and a homopolymeric block of styrene.

The preferred class of materials to which the present invention is especially applied comprises block copolymers having two or more dissimilar polymer blocks. Examples of these would be polystyrene-polyisoprene, polystyrene-polybutadiene, polystyrene-polyisoprene-polystyrene, polystyrene-polybutadiene-polystyrene, as well as branched counterparts of these. Linear polymers of any of these categories are especially contemplated.

The lithium-based initiators are well known in the art and include monofunctional as well as polyfunctional initiators. Most favored are the lithium alkyls such as lithium isopropyl, lithium normal butyl and lithium secondary butyl as well as lithium pentyl and higher homologues. The proportion of initiator to monomers does not form a part of the present invention and is also a factor known in the art. This applies likewise to the average molecular weight of the polymers obtained, which is controllable by the proportion of initiator as well as operating factors such as temperature and time. Since each growing polymer chain end is capped with a lithium ion, the smaller the proportion of the lithium-initiator the higher the average molecular weight of the polymeric product will be.

The living polymers are prepared in the presence of a solvent. This solvent will depend at least in part on the solubility of the monomers and polymers therein as well as upon the temperature and pressure under which the polymerization is conducted. Hydrocarbon solvents are preferred and, since the polymerization is followed by hydrogenation, it is also preferred that saturated hydrocarbons be employed during the polymerization. This does not rule out the use of unsaturated solvents but it will be realized that these may be saturated and therefore consume hydrogen during the subsequent hydrogenation step. Suitable hydrocarbon solvents for many of the monomers contemplated include pentanes, hexanes, cyclohexane, cyclopentane and heptanes, as well as mixtures of the same. Frequently, an ether is a minor component of the solvent. It may be used to alter the diene microstructure during polymerization or for other purposes. The proportion of solvent to the monomer is not of critical importance relative to the present invention. This will depend at least in part upon the operable viscosity of the polymeric solution which results. The solvents should be inactive both to the living polymer and to the various compounds present or added to the polymerization or hydrogenation system.

The polymerization temperature used in preparing the living polymer may be suitably selected within the range from about −78°C to the boiling point of the solvents employed. The time of polymerization will be selected to permit essentially complete polymerization of all of the monomer introduced into the system, unless provision is made for removing unreacted monomer at some stage or stages during or subsequent to polymerization.

Following the polymerization step, the polymer chains so produced have their growing end or ends capped with lithium ions. One aspect of the present invention comprises termination of the living polymer by reaction with at least an equivalent amount of certain selected proton-donating materials. The selection is based upon the relative boiling points of the proton donor and the maximum boiling point of the solvent utilized in this stage. The specific boiling points are not important although the relative boiling points are. The present invention contemplates utilizing a solvent having a maximum boiling of about $X°C$ in which case the proton-doning material should have a boiling point of at least $X + 40°C$ and preferably at least $X + 50°C$. The boiling range of the proton donor usually is between 120° and 210°C, preferably between 130° and 190°C. The proton-doning material should have been between 6 and 12 carbon atoms per molecule when alcohols are the terminator, and 3–10 carbon atoms when carboxylic acids are the proton donor. Suitable species which meet this requirement include especially alcohols such as hexanols, heptanols, octanols, decanols, and dodecanols. More specifically, 2-ethyl hexanol is a preferred species. 2-ethyl decanol may be utilized as well as cyclohexanol and 2-methyl cyclohexanol. 2-ethyl hexanol is especially suitable when the major solvent species is cyclohexane. Carboxylic acids such as propionic and butyric are suitable. The boiling points referred to throughout the specification and claims are meant to refer to boiling points at atmospheric pressure.

Once the polymerization has been completed and the living polymers have been terminated by treatment of the same in solution with the above described class of proton-donating materials (which may take place at any desired temperature or time such as 20°–100°C for 1–360 minutes), the solution of the terminated polymer is then subjected to hydrogenation.

The present invention is especially directed to the use of a particular class of hydrogenation catalysts. These have been selected because of their efficiency with respect to rate and yield as well as with respect to their capability of causing hydrogenation of both conjugated diene polymer blocks and monovinyl arene polymer blocks. Two types of reaction products are especially contemplated for use as catalysts. These comprise the reaction products of halogen-free aluminum alkyl compounds with cobalt or nickel or carboxylates or with nickel or cobalt alkoxides, both generically referred to in this specification as cobalt or nickel salts.

The cobalt or nickel carboxylate has at least one hydrocarbon radical of from 1 to 12 carbon atoms. The reduced compositions may be prepared and used as hydrogenation catalysts in situ or may be prepared separately from and prior to use. Ordinarily, moderate amounts of heat are employed to effect reduction of the metal compounds, although heating is not always required. For convenience, temperatures of from 0°C to 250°C may be employed, although temperatures from about room temperature to 200°C are especially suitable.

The ratio of organometallic reducing agents to cobalt or nickel carboxylates may vary widely since even a partial reduction results in the production of an active hydrogenation catalyst. Molar ratios of the aluminum alkyl compound to carboxylate between 0.1:1 to 30:1 (preferably 0.5:1 to 10:1) may be used. The reducing agent utilized in the preparation of the catalyst is a halogen free aluminum alkyl compound, preferably an aluminum trialkyl but also included are aluminum alkyl hydrides. Preferably the alkyl radicals contain from 1 to 10 carbon atoms such as methyl, ethyl, propyl, butyl, pentyl, hexyl, octyl, nonyl, or decyl. Trialkyl aluminum reducing agents are especially preferred.

The cobalt or nickel alkanoates utilized in the formation of the catalysts are to be halide-free alkanoates containing from 1 to 12 (preferably 6–10) carbon atoms. The preferred species include nickel or cobalt hexanoates, octanoates or decanoates. Mixtures of cobalt or nickel alkanoates or of aluminum alkyls may be utilized. The catalyst may be either homogeneous, in slurry form or supported. The slurry formed catalyst may be easily prepared by contacting the metal compound in an anhydrous solvent with the aluminum alkyl in a dry inert or hydrogen atmosphere. When this procedure is followed, the solution turns black, heat is evolved and a black deposit forms.

The above-described Ziegler type of hydrogenation catalyst may be used as such but optionally is activated with proton donors, more specifically described as primary, secondary or tertiary alcohols as well as primary or secondary amines, previously described as proton donors. Thus, the same materials which have been previously used as the terminating agents also may be used for activating the hydrogenation catalyst if desired. This is done during catalyst preparation or by addition to the hydrogenation reaction mixture containing not only the above-described catalyst components but also the polymer and its solvent. It is preferred that the same species of material be utilized for both proton donating and activation. While this is a desirable expedient since it simplifies later purification and recovery stages, it is not essential as long as both the proton donor and the activator meet the limitations described above, namely, that both donor and activator boil at least 40°C higher than the maximum boiling point of the solvent but below 210°C.

Hydrogenation is carried out under conditions such as those described in U.S. Pat. No. 3,644,588. The hydrogenation may be conducted in a single stage or in more than one stage with temperature and pressure varied as desired. Hydrogenation may be selective, partial or complete. For example, with block copolymers of styrene and a conjugated diene it has been found that hydrogenation utilizing the above-described catalysts occurs with great rapidity in reducing the olefinic unsaturation, but that more severe conditions may be required to saturate the aromatic unsaturation of the polystyrene block. Both of such alternatives are considered in the present invention and do not form a critical limitation of this invention.

Following hydrogenation, it then becomes necessary to isolate and purify the hydrogenated polymeric product on the one hand and the main components of the solvent phase on the other. This is conveniently done by coagulating the polymer such as by contact with a steam jet. This simultaneously flashes off the solvent, substantial portions of the proton donor and of the activator and isolates the polymeric product as a crumb or particle which may be handled as a water slurry.

The polymeric product is then treated to remove water and any residual amounts of solvent, proton donor and of optional activator which may contaminate it. This is conveniently effected by subjecting the coagulated product to conventional drying techniques for removing water and residual proton donor, activator and solvent. Other forms may be employed. One aspect of the present invention comes in to play at this point in that the limitation imposed on the maximum boiling point of the proton donor and activator results in relatively facile removal of these contaminants from the polymer.

The solvent vapor and steam phase which has been flashed off passes to a condenser and normally separates into a liquid water phase and a liquid solvent phase, the latter being contaminated with residual amounts of both the proton donor and the optional activator. This solvent phase is easily separated from the aqueous phase by decanting and is passed to a fractionating section such as a fractionating column or a multiplicity of such columns. Fractional distillation is carried out and at this point the second aspect of the present invention becomes evident. Due to the wide difference in boiling points between the solvent on the one hand and the proton donor and activator on the other it is possible to substantially completely separate the solvent from these two contaminants since the latter remain in a bottoms fraction while the solvent passes overhead and can be recycled for the use in the initial polymerization step.

The following is an illustrative embodiment of the present invention:

ILLUSTRATIVE EMBODIMENT

Styrene (1.03 parts by weight) is polymerized in cyclohexane (19.6 parts by weight) solution using sec-butyl lithium (65 ppm) as the initiator. After about ½ hour at 50°C, all of the initial charge of styrene has polymerized to form a polymer block of 25,000 average molecular weight; butadiene (4.14 parts in 11.9 parts cyclohexane) is then injected and allowed to block-polymerize with the living polystyrene until the polybutadiene block has an average molecular weight of 100,000 and no more monomer remains. A second charge of styrene equal to the first is then injected and block polymerized to form the living three-block copolymer polystyrene-polybutadiene-polystyrene Li. Termination of the polymer is then effected by injection of a sufficient amount of 2-ethyl hexanol to react with the lithium ion.

The polymer solution is then contacted at 90°C with hydrogen (700 psig) in the presence of a catalyst comprising the reaction product of nickel octoate and aluminum triethyl, Al/Ni 3.2 molar, until essentially all of the aliphatic unsaturation in the polybutadiene block is reduced (about 4 hours).

The hydrogenated polymer is separated from the solvent by coagulation with steam to form polymer crumb which is degassed and dried. The condensed solvent is decanted from the condensed aqueous phase and purified by fractional distillation in a 30tray distillation column, the cyclohexane being drawn off from tray 20, and the 2-ethylhexanol accumulating in the bottoms. The cyclohexane contains essentially no 2-ethyl hexanol and is recycled for use in the polymerization stage. When isopropyl alcohol is employed instead of 2-ethylhexanol, an azeotrope of cyclohexane and about 30% alcohol is formed in the solvent recovery distillation. Hence the recovered solvent can not be recycled without further purification.

I claim as my invention:

1. The cyclic process which comprises:
   a. forming a living polymer by anionic solution polymerization with a lithium-based initiator, the solvent for said solution having a maximum boiling point of X°C at atmospheric pressure, said living polymer having a lithium ion capping at least one end of a polymer chain by a metal-carbon linkage;
   b. terminating the polymer by contact in the polymer solution with at least a sufficient amount of a proton-donor organic compound having a boiling point of at least X + 40°C and below 210°C, to react with each lithium ion;
   c. subjecting the terminated polymer while still in said solution to hydrogenation, using as the hydrogenation catalyst the reaction product of a nickel, cobalt or iron alkanoate or carboxylate and an organo aluminum reducing agent;
   d. coagulating the hydrogenated polymer with steam, said polymer containing minor proportions of the proton donor, the solvent and steam being flashed from the coagulated polymer;
   e. heating the polymer sufficiently to volatilize the proton donor;
   f. fractionally distilling the solvent phase containing minor amounts of the proton donor whereby a distillate fraction comprising a majority of the solvent is separated from a bottoms phase comprising a majority of the proton donor;
   g. and recycling the purified solvent so obtained for use in step a).

2. A process according to claim 1 wherein the proton donor is an alcohol.

3. A process according to claim 1 wherein a hydrogenation catalyst activator is employed comprising a compound of the group consisting of alcohols, carboxylic acids and amines boiling between 120°C and 210°C, said activator being later removed in steps (e) and (f).

4. A process according to claim 1 wherein the solvent comprises cyclohexane and the proton donor comprises 2-ethyl hexanol.

5. A process according to claim 3 in which the solvent comprises cyclohexane and both the proton donor and hydrogenation catalyst activator comprise 2-ethyl hexanol.

* * * * *